US012572814B2

(12) United States Patent
Weinwurm

(10) Patent No.: US 12,572,814 B2
(45) Date of Patent: Mar. 10, 2026

(54) ARTIFICIAL NEURAL NETWORK BASED SEARCH ENGINE CIRCUITRY

(71) Applicant: ObviousFuture GmbH, Kaiserslautern (DE)

(72) Inventor: Eduard Weinwurm, Vienna (AT)

(73) Assignee: ObviousFuture GmbH, Kaiserslautern (DE)

( * ) Notice: Subject to any disclaimer, the term of this patent is extended or adjusted under 35 U.S.C. 154(b) by 0 days.

(21) Appl. No.: 18/802,747

(22) Filed: Aug. 13, 2024

(65) Prior Publication Data

US 2024/0403650 A1     Dec. 5, 2024

Related U.S. Application Data

(63) Continuation of application No. 18/613,379, filed on Mar. 22, 2024.

(Continued)

(51) Int. Cl.
   *G06N 3/045*       (2023.01)
   *G06N 3/091*       (2023.01)
   *G06N 20/00*      (2019.01)

(52) U.S. Cl.
   CPC ............. *G06N 3/091* (2023.01); *G06N 3/045* (2023.01); *G06N 20/00* (2019.01)

(58) Field of Classification Search
None
See application file for complete search history.

(56) References Cited

U.S. PATENT DOCUMENTS 8,909,026 B2    12/2014   Ostermann et al.
10,720,182 B2    7/2020   Gonzalez-Banos et al.
(Continued)

FOREIGN PATENT DOCUMENTS

CN      114550070 A     5/2022
CN      112131431 A     1/2024
(Continued)

OTHER PUBLICATIONS

Junior, J.C.S.J., Musse, S.R. and Jung, C.R., 2010. Crowd analysis using computer vision techniques. IEEE Signal Processing Magazine, 27(5), pp. 66-77. (Year: 2010).*
(Continued)

*Primary Examiner* — Oluwatosin Alabi
(74) *Attorney, Agent, or Firm* — Hall Estill Law Firm

(57) ABSTRACT

Method and apparatus for characterizing digital content using artificial neural network (ANN) techniques. In some embodiments, computer data sets (such as video, audio, text, etc.) are processed to generate a corresponding sequence of multi-dimensional embedding vectors in a latent space. The embedding vectors are grouped into intervals (segments) of the data sets based on movement metrics associated with the embedding vectors. A representative vector (RV) is selected for each group. Thereafter, in response to a query input, selected intervals among the various computer data sets are identified and output based on a similarity measure between the RVs and a search vector derived from the query input. Further embodiments provide a transformation model that transforms the embedding vectors and/or the RVs from a first latent space based on a first embedding model to a different, second latent space based on a second embedding model.

30 Claims, 5 Drawing Sheets

Related U.S. Application Data

(60) Provisional application No. 63/536,456, filed on Sep. 4, 2023, provisional application No. 63/454,104, filed on Mar. 23, 2023.

(56) References Cited

U.S. PATENT DOCUMENTS

| | | | |
|---|---|---|---|
| 10,949,907 | B1 | 3/2021 | Jain et al. |
| 11,151,203 | B2 | 10/2021 | Natchu |
| 11,269,870 | B2 | 3/2022 | Bhatia et al. |
| 11,381,614 | B2 | 7/2022 | Weinwurm et al. |
| 11,398,253 | B2 | 7/2022 | Gonzalez-Banos et al. |
| 11,756,561 | B2 | 9/2023 | Garbacea et al. |
| 12,143,695 | B2 | 11/2024 | Guo |
| 2019/0114680 | A1 * | 4/2019 | Chien ..................... G06N 20/00 |
| 2020/0234725 | A1 * | 7/2020 | Garbacea ................. G10L 19/16 |
| 2020/0311798 | A1 | 10/2020 | Forsyth et al. |
| 2020/0342646 | A1 * | 10/2020 | Wang ..................... G06N 3/045 |
| 2021/0397610 | A1 * | 12/2021 | Singh ..................... G06N 3/044 |
| 2023/0033989 | A1 * | 2/2023 | Maurer ................... G06T 7/248 |
| 2023/0104757 | A1 * | 4/2023 | Pramod ................ G06N 3/0475 |
| | | | 706/11 |
| 2023/0300428 | A1 | 9/2023 | Guo |
| 2024/0395028 | A1 * | 11/2024 | Chemerys ............... G10L 15/22 |

FOREIGN PATENT DOCUMENTS

| | | | |
|---|---|---|---|
| WO | 2024015322 | A1 | 1/2024 |
| WO | 2024194497 | A1 | 9/2024 |

OTHER PUBLICATIONS

Zhang L, Radke RJ. Natural language video moment localization through query-controlled temporal convolution. InProceedings of the IEEE/CVF Winter Conference on Applications of Computer Vision 2022 (pp. 682-690). (Year: 2022).*

Riedl, M., et al.; "Text Segmentation with Topic Models"; JLCL 27:1 (2012) 47-69.

PCT/EP2024/057946; International Search Report and Written Opinion; International Searching Authority; European Patent Office; mailed Jun. 11, 2024; 14 pages.

* cited by examiner

SPOKEN AUDIO CONTENT

NON-VERBAL AUDIO CONTENT

ARTIFICIAL NEURAL NETWORK BASED SEARCH ENGINE CIRCUITRY

RELATED APPLICATIONS

The present application is a continuation of U.S. patent application Ser. No. 18/613,379 filed Mar. 22, 2024, which in turn makes a claim of domestic priority to U.S. Provisional Patent Application No. 63/454,104 filed Mar. 23, 2023, and to U.S. Provisional Patent Application No. 63/536,456 filed Sep. 4, 2023. The contents of all of these applications are hereby incorporated by reference.

BACKGROUND

Artificial neural networks (ANNs), also sometimes referred to as machine learning (ML) systems, neural networks (nets), artificial intelligence (AI) systems, etc., are computer-based systems that attempt to mimic the operation of biological neural networks such as found in higher complexity animal brains. ANNs can be used in a variety of applications including, but not limited to, image and speech recognition, language translation, social media filtering, medical diagnosis, gaming, trend and cyclic forecasting, chatbot systems, graphical generators, musical composition, and so on.

ANNs are trained to perform certain computational and analysis tasks without being programmed with specific, task-based rules. A typical neural network can include a collection of connected units or nodes, which can be thought of as loosely modeling neurons in a biological brain. Each node (artificial neuron) transmits signals to other nodes as output values, which usually take the form of real numbers. The output values are provided with a magnitude that is computed by some function that combines one or more input values presented to that node.

A weight value may be assigned to each node, with the weight value being adjusted up or down during a training interval to increase or decrease the strength of the output signal at the associated node (e.g., the magnitude of the output value). In some cases, a threshold may be applied to each node such that outputs are only passed to downstream nodes if the magnitude of a given upstream node exceeds the threshold. As with the weights, the thresholds can be adaptively adjusted during training. Other forms and constructions of ANNs can be used.

ANNs often work by attempting to reduce dimensionality, so that higher dimensional input data are reduced in the number of dimensions layer by layer, forming an internal representation of the data in a lower dimensional space. While operable, one limitation with this approach are the amounts of resources and computational complexity needed to process large amounts of source data.

In particular, media data sets (e.g., files, objects, etc.) are a type of source data that are exceedingly difficult to process using ANNs. The media data sets can take various forms such as video (e.g., movies, etc.), text, audio (e.g., sound recordings, podcasts, etc.), and so on. Videos have many frames per second, fps (e.g., 10, 24, 30, 60 or even 120 or more fps), and each frame has a separate vector to describe the information stored in that frame. Text can be broken down into many different forms, including words, phrases, sentences, paragraphs or even an entire article. Audio can have both the actual words spoken as well as higher level contextual associations that are not explicitly present in the words themselves, but are carried along with the text in the mind of the author or the audience (sender or receiver).

These and other considerations can make it difficult to search a server or other repository of digital content and quickly and efficiently locate desired portions of the content, even with the use of a neural network. Searching can be even more difficult if the various repositories store the data in various forms and characterizations. Various embodiments of the present disclosure are directed to solutions that address these and other limitations in the existing art.

SUMMARY

Various embodiments of the present disclosure are generally directed to systems and methods for characterizing and accessing data using an artificial neural network (ANN) system.

Without limitation, some embodiments process one or more computer data sets (e.g., files, objects, etc.) to generate a corresponding sequence of multi-dimensional embedding vectors in a latent space. The data sets each have one or more types of digital content such as video, audio, text, etc.

The embedding vectors are grouped into intervals (segments) of the data sets based on movement metrics associated with the embedding vectors, and a representative vector (RV) is selected for each group. Thereafter, in response to a query input, selected intervals among the various computer data are output based on a similarity measure between the RVs and a search vector derived from the query input. In some cases, the query input and the corresponding output may be supplied via one or more agent interfaces.

Further embodiments provide a transformation model that can transform the embedding vectors and/or the RVs from a first latent space based on a first embedding model to a different, second latent space based on a second embedding model.

These and other features and advantages of various embodiments can be understood from a review of the following detailed description in conjunction with the accompanying drawings.

DETAILED DISCUSSION

Figures 1, 2, 3:
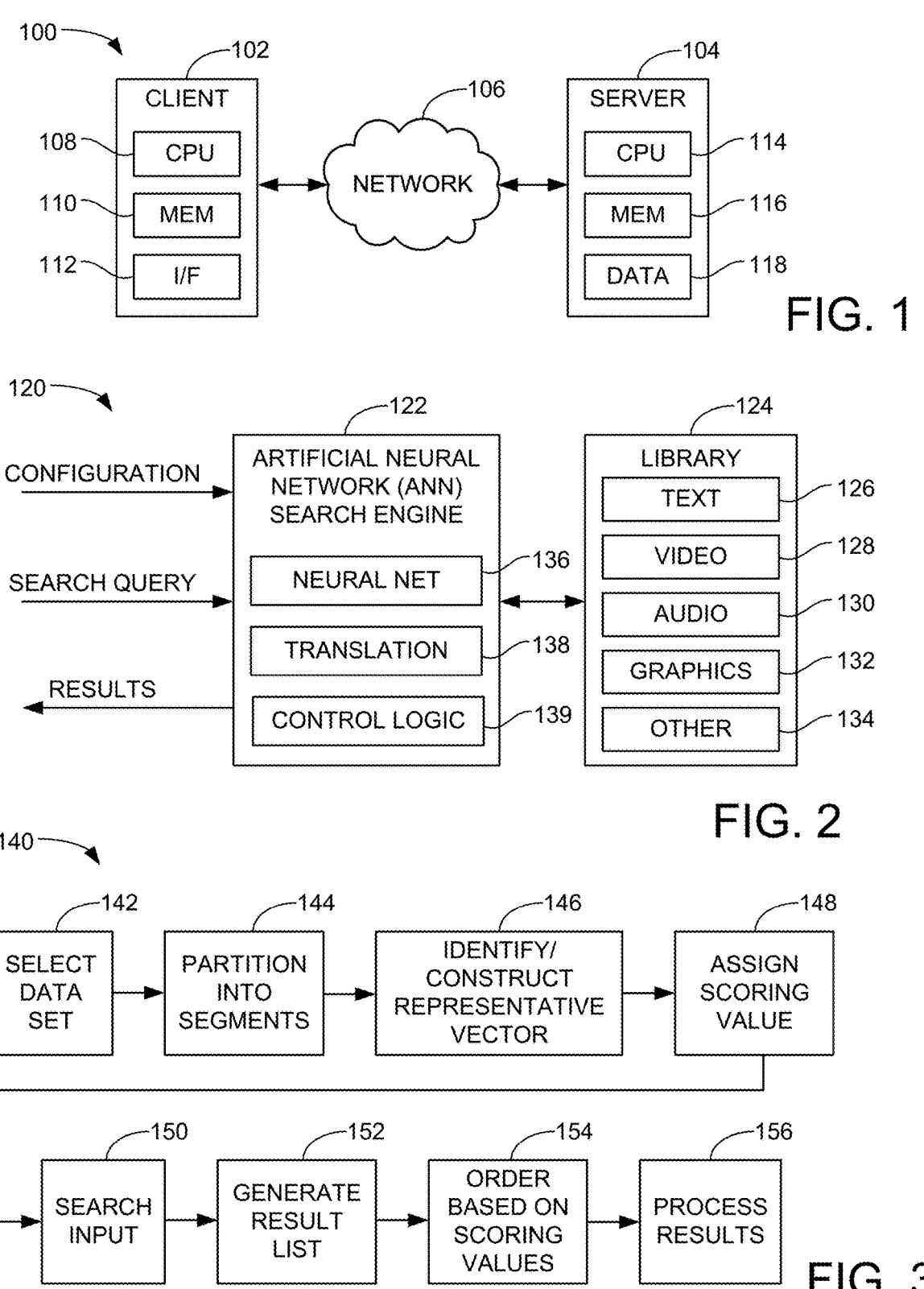
FIG. 1 is a functional block representation of a data processing system constructed and operated in accordance with various embodiments of the present disclosure.
FIG. 2 is a functional block representation of an artificial neural network (ANN) search engine and a corresponding library of data sets incorporated into the system of FIG. 1 in accordance with some embodiments.
FIG. 3 is a sequence flow diagram illustrating operation of the engine of FIGS. 1-2 in accordance with some embodiments.

Various embodiments of the present disclosure generally provide multiple related solutions to accessing and using a repository (library) of digital content, such as a server or local drive that stores files, objects and/or other types of computer data sets. While not limiting, the digital content may constitute media data sets of various types including, but not limited to, videos, motion pictures (movies), audio recordings, podcasts, text articles, documents, computer programs, images, graphical works, spreadsheets, diagrams, etc.

As explained below, a first exemplary method can be used to reduce sequences of data represented in latent spaces based on usefulness. In this approach, each element of data in a sequence, such as each frame in a video, is identified and processed using a neural network to generate a multi-dimensional embedding vector in a latent space. The embedding vector describes all, or substantially all, of the content in the associated data element.

The embedding vectors are translated into a sequence of movement vectors in relation to variations that are detected between one embedding vector to the next. The movement vectors are evaluated using various techniques to locate natural groupings or breaks within the sequence. This defines a number of intervals (segments), with each interval having embedding vectors with relatively low levels of variation from one embedding vector to the next.

Each interval can be summarized or represented as a single combined vector that describes the associated group of embedding vectors within the interval. A variety of approaches and techniques are discussed based on the nature and rate of change (velocity, etc.) among the vectors. Searching can thereafter take place based on locating those combined vectors that have the greatest similarity to an input query.

A second exemplary method operates with text and similar types of data sets that do not have a repetitive sequence like a frame rate. Instead, the content is divided into appropriate groupings, such as sentences, which can vary greatly in length and are often arbitrary. The solution involves utilizing a moving or sliding window of different lengths of the sequences (part of sentence, full sentence, group of sentences, etc.) to obtain combined vectors. As before, movement among the vectors from one grouping to the next can be evaluated to determine boundaries between useful intervals and combined vectors. The combined vectors are thereafter utilized to identify those that are most similar to the input query or other input data for searching and other processing purposes.

A third exemplary method operates upon audio recordings, such as but not limited to dialog or monologue data in a podcast or other types of data sets. The data may constitute sounds that are detectable within a range of human hearing (e.g., sound recording, etc.), but other types of multi-spectral waveform data can be evaluated. In this case, the length of discussion is content based and may either be short or extended. Speech-to-text conversion and other techniques may be used to identify segments of associated content.

The segments can be identified and combined vectors generated as before for each segment. Further features can include a scoring function that assesses the relative amount of variability within the embedding vectors of a particular interval, and a ranking function that can be used to evaluate similarity in comparison to an input query. Other embodiments can include combining length of intervals, variance among successive vectors or other statistical parameters to arrive at a final searchable matrix for selected content.

These and other methods described herein can be used on substantially any suitable types of data sets as required. While not limiting, one contemplated application is a search engine executable on a local or server processor to evaluate, search and return search results from a group of accessible data sets (e.g., a local library, etc.). The searches can take any number of forms and formats. Some non-limiting example queries of the types that can be effectively carried out by the various embodiments include, but are not limited to, the following:

(1) "locate all scenes where someone is wearing a red hat;"

(2) "find a paragraph where ancient Greece is discussed;" and (3) "cue the audio portion of a portion of spoken audio where the speaker talks about liking Italian food."

In the first example (locate people wearing a red hat), the first method may be used to locate combined vectors for the set of video data within the library that have the closest similarity to the idea of a red hat. Some will be identified as suitable candidates, whereas others can be excluded.

Once the combined vectors for the candidate segments are located, a more detailed search, including evaluation of the combined vector for the desired content (e.g., a red hat), can be carried out. Those combined vectors that may contain a red hat may then be used to point to individual frames that have a red hat (or other red object that might be a hat), and then as required individual frames can be located to find a human person that actually wears a red hat. The frames are then identified, and for those segments that are consecutive, the scenes can be used.

The system can also, depending on the query syntax, locate the beginning of the actual scene, or provide a subset of those frames (such as on a time/stamp basis) where a human is wearing a red hat. That information can be supplied to the user in any number of suitable formats, including a video player queued to the desired locations, a textual description extracted from the combined vector, and so on.

In the second example (ancient Greece content), the text already exists in written parsable form, so a search of the combined vectors can locate candidate segments that may satisfy the query. Second level analysis of the content in the candidate segments can then be carried out to return the desired text. It is noted that the term "ancient Greece" has many implications from a contextual standpoint (e.g., history, philosophy, Olympic games, religion, language, socio-economic implications, modern economic issues that are impacted by the Greek Empire, and so on). These may be used as part of the multi-level analysis, with the highest level results based on similarity measures returned to the user.

In the third example (locate where the speaker likes Italian food), the speaker may not have used the term "Italian food" when speaking, just as the term "ancient Greece" may not appear in the text data searched by the second method above. Instead, the speaker may have said something like, "I really enjoy pizza" or "Gino's restaurant downtown is really great," etc.

In this case, the processing performs an analysis of the combined vectors as before, further based on the context of the various intervals of related context. The abstraction from the actual content to the more general idea of "Italian food" is part of this analysis, as before. The results can be provided to the user in any suitable format, including queued sections of audio using an audio player, a transcribed description of the conversation, etc.

It can be seen from these simple examples that the aggregation and analysis of the various data sets into combined vectors based on segments of content enables the system to quickly identify candidate segments that can thereafter be subjected to more detailed analysis, thereby eliminating the need to go through and evaluate the entirety of the library each time a query is presented.

The result is an intelligent search engine that provides the mechanism to efficiently sort through many different types of media in order to provide matching results. Outputs can be displayed in any number of ways, including tabulated form, selectable links to initiate playback, conversion of audio to text or vice versa, generation of new content based on the specified criteria and the content stored in the media data (alone or in combination with other content located by the system elsewhere), and so on.

These and other features and advantages of various embodiments will be explained in greater detail beginning with a review of FIG. 1 which depicts an exemplary data processing system 100. The system 100 includes a local client (host) device 102 and a remote server 104 coupled to the client device 102 via an intervening computer network 106. Other arrangements can be used, so it will be understood that the configuration of FIG. 1 is merely illustrative and is not limiting.

The client device 102 (also sometimes referred to as a user device or an agent device) may take any number of forms such as a desktop computer, a laptop, a tablet, a smart phone, a workstation, a gaming console, a LAN, a terminal, or some other form of interactive device suitable for use by an agent in accessing the system. As used herein, the term "agent" will be understood as referring to a human or artificial (non-human) user of the system. Artificial users of the system can include AI-based systems, robots, programs, routines, or other entities that utilize the system. It will be appreciated that, as explained below, the various embodiments described herein can be incorporated into any number of different processing environments and sequences. Reference to the "user" will thus be understood as covering either or both a human or non-human agent.

The client device 102 includes a client controller (CPU) 108, memory 110 and an agent interface (I/F) 112. The controller 108 may be a programmable processor that executes software/firmware stored in the memory 110, including one or more applications (apps) or other routines. One or more hardware processors or other logic can be used in conjunction with, or in lieu of, the programmable controller 108. The agent interface 112 may include a display, pointing device, touch screen, keyboard, and/or any other elements useful in providing an agent interface for the particular agent or agents that use the system.

The server 104 is shown to similarly incorporate a server (network) controller (CPU) 114, memory 116 and data 118. The server 104 may be a gateway that in turn connects to other nodes in the network to provide the required functionality. In some cases, the operation of the system is carried out by the execution of one or more routines that are stored and executed locally at the client level, remotely at the server level, or both. Similarly, the data represents a data repository or library that stores the evaluated data sets (files, objects, etc.) and such storage may be local, remote, or both.

The network 106 may be a local network, a public network, a private network, a cloud or edge computing distributed network, the Internet, or some other suitable arrangement. Data centers, container storage, local and web-based applications and other techniques can be utilized as required without limitation.

FIG. 2 shows a data evaluation system 120 that is incorporated into the system 100 of FIG. 1 in accordance with some embodiments. The system 120 includes an artificial neural network (ANN) search engine 122 operably connected to a data library 124. The ANN search engine 122, also sometimes referred to as an ANN circuit, may be realized in hardware, firmware, software, or a combination of the above. Aspects of the engine may be executed by either or both the client and/or server controllers 108, 114, or another module within the system 100.

The library 124 includes a variety of different types of computer data sets, including text 126, video 128, audio 130, graphics (such as still images, etc.) 132, and other types of source material 134 evaluated by the system 120 (e.g., computer code, CAD files, etc.). Substantially any form of content can be evaluated by the system, so that the examples shown in FIG. 2 are merely exemplary and are not limiting. While the library 124 is represented as a single repository, it will be understood that the content data may be geographically distributed across multiple locations, so long as the data are directly or indirectly accessible by the search engine 122.

The search engine 122 includes various elements including one or more neural nets 136, translation modules 138 and control logic 139. Other configurations can be used as required. As before, these elements can be realized in hardware and/or firmware/software as required.

The user interacts with the search engine 122 in a number of ways, depending on the requirements of a given application. In at least some cases, the user can initially provide configuration inputs to the search engine 122 to identify to the search engine 124 the source materials to be processed. The search engine 124 processes the source materials as explained below to place the materials in a suitable format. Once this processing is completed, the search engine 122 can thereafter receive search terms and other queries from the user, which are processed by the search engine to provide search results which are supplied to the user for further operations.

FIG. 3 is a flow diagram 140 to provide a top level overview of the operation of the system 120 of FIG. 2 in at least some embodiments. Generally, for each data set to be configured in turn (block 142), the data set (e.g., file, object, other type of element, etc.) is partitioned into segments or intervals (block 144). Each segment will take a form depending on the type of data set, but in general, each segment will constitute a portion of the overall data set that has a sufficient nexus from a content standpoint to be treated as a unit.

Each segment is thereafter processed to derive a representative member (vector) of the associated segment at 146. The representative vector (RV) may be an actual member of the segment, or may be a constructed (non-existent) vector that represents statistically representative information for all of the vectors in the segment. An associated scoring value or values may be generated at 148 in relation to the variation within the segment as well as other characteristics relating to the RV. The foregoing steps are carried out for each data set to be evaluated in turn.

Thereafter, the processed data can be subjected to a search via a query input at block 150. A result list of segments having sufficient nexus to be of interest to the input is generated at 152. This list is evaluated via the scoring values at 154 to provide an output in a form to enable the user to access, evaluate, select or otherwise use the results. A ranked listing of the located segments may be displayed, or the data may be returned in some other suitable form. The user thereafter processes the results at 156. This can include reviewing the identified sections of the original source material, incorporation of the same into a downstream process, etc. In some cases, the system can be recursive, so that the output is used as a new input to the system. In other cases, the output of the system 140 can serve as an input to another AI-based system to generate content, etc.

In order to discuss these and other features in detail, it will first be helpful to briefly review the concept of dimensionality in the context of an ANN. A main operative principle of ANNs and other deep learning systems is achieving a reduction of dimensionality among the evaluated data. Highly dimensional input data are reduced in the number of dimensions layer by layer, forming an internal representation of the data in a lower dimensional space.

One of such lower dimensional spaces is the latent feature space or embedding space, in which items resembling each other are positioned closer to one another. This can be used to compare different data, as each data point fed into the neural network is represented as a vector in the feature space. Such vectors are sometimes referred to herein as embedding vectors. Generally, related input data will tend to have corresponding embedding vectors that are relatively close to each other in the latent space.

This closeness in latent space is useful when comparing different input data to each other, for example to discover similar images or to find similar statements in texts. However, this traditional methodology has some practical disadvantages: for example, when comparing a series of images such as in a motion picture (movie), a vector may be generated and stored for every image or frame in the movie which has to be later compared. A single hour of video footage would represent approximately 110,000 such vectors. A search would require a comparison of each of these vectors to a query vector (for example, by calculating the dot product) to find the most similar vectors to the query. This provides an unwieldy solution, and is exasperated by expansions in the number of evaluated vectors.

Another problem is encountered when working with textual data, with regard to how the data should be grouped. Identifying the most meaningful part of a textual work to embed and store vectors has been found extremely challenging. Other types of content have similar limitations.

Various embodiments of the present disclosure overcome these and other limitations of the existing art. The same basic approach is used for all media types, although each different type of media may be processed using a specifically tailored approach.

Figures 4A, 4B, 4C, 5A, 5B, 6A, 6B:
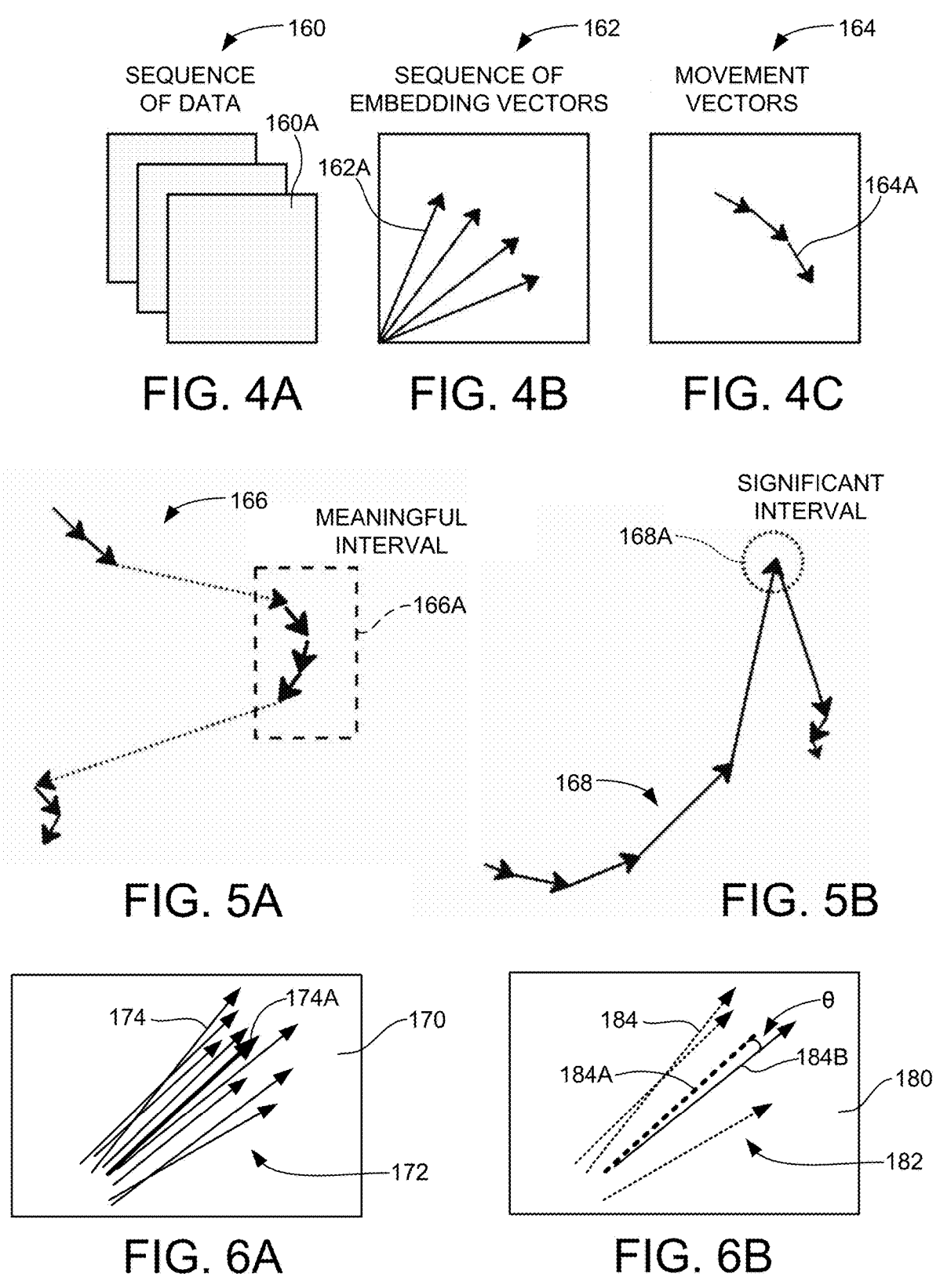
FIGS. 4A through 4C depict aspects of media content processed by the engine in some embodiments.
FIGS. 5A and 5B illustrate a first method for identifying respective intervals of related media content such as in FIGS. 4A-4C in some embodiments.
FIGS. 6A and 6B illustrate different ways in which the engine can determine a representative vector (RV) for each interval identified in FIGS. 5A-5B in some embodiments.

FIGS. 4A through 4C have been provided to illustrate a concrete example of the processing provided by the ANN search engine 122 from FIG. 2 in some embodiments. In this case, the media type under consideration will be a full-length motion picture 160. As will be recognized, the motion picture 160 is made up of a sequence of data elements, e.g., frames 160A, each comprising a still image.

To provide a sense of scale, it will be assumed that the motion picture 160 is approximately 90 minutes in length and is provided with 30 frames per second (fps). This provides a total of approximately 162,000 frames to be evaluated for this one file. Other sizes and configurations can be used.

Each of these approximately 162,000 frames will have a unique ID value, such as a frame number, count, timestamp, etc. It is noted that only the video aspects of the motion picture will be processed in this example. The separate soundtrack (e.g., audio text, sounds, music, etc.) of the motion picture that accompanies the video presentation can be processed by the search engine in a follow up pass using somewhat similar techniques described below. However, it is contemplated that evaluation of both audio and video aspects of the motion picture can be performed concurrently.

In FIG. 4A, each video frame 160A in the motion picture 160 is sequentially forwarded in turn to the neural net portion 136 of the engine 122. The neural net portion 136 creates a corresponding vector 162A in a corresponding latent space 162. The frames 160A are thus translated into a corresponding sequence of embedding vectors 162A that are temporarily stored by the system, as generally represented in FIG. 4B.

The embedding vectors 162A are each provided with a magnitude and direction in the multi-dimensional latent space 162. Many hundreds, thousands or even more dimensions (orthogonal axes) can be defined within the space. Ultimately though, whatever the scale, each embedding vector will provide a unique distillation of the visual content of each frame as measured along each of the orthogonal dimensions within the latent space.

Because the embedding vectors 162A are associated with the sequential frames 160A, the embedding vectors represent a sequence in time from one frame to the next. This sequence can be alternately viewed as a single moving point (or moving vector) in the latent space 162. The movement characteristics of this point in space (or angular velocity of this vector), such as the speed, direction of movement, etc., can be characterized as indicated by movement vector 164A in FIG. 4C. A useful characterization is velocity (both speed and direction), although other characterizations can be used as well, including higher or lower order values (e.g., position, acceleration, jerk, etc.).

The velocity (movement vectors 164A) is used to determine time intervals (also referred to as "segments") with similar frames. One useful way to select each interval is to detect transitions where the velocity (or other movement metric) undergoes significant transitions, and to set the borders of the segment to correspond to such transitions. The borders can be identified in a number of ways, including but not limited to particular time stamps, frame counts, etc. in the original sequence 160.

A meaningful transition is represented at 166A for a series of movement vectors 166 in FIG. 5A. As will be understood by the skilled artisan, the significant change to the interval 166A may represent a change in scene, a change in camera angle, a cutaway to a new image, a transition to black, etc. It therefore can be useful to establish those embedding vectors (162A, FIG. 4B) that correspond to the interval 166A as falling within a separate interval (segment) for classification purposes. It can be seen that the interval 166A is transitioned by significant changes in velocity at each end of the interval.

From a practical standpoint, the various frames corresponding to the vectors within the interval 166A may be a continuous scene with the same (or similar) visual elements, camera angle, lighting, etc. A change to these and other types of parameters, such as a cutaway to the face of a different speaker, may be detected as a separate interval. Nonetheless, the boundaries will depend upon the transitions among the movement vectors, which in turn will depend, at least in part, on the encoding used to define the embedding vectors.

In another example, accelerated or peaking movement can be used to identify intervals of interest. FIG. 5B shows peaking movement in a significant interval 168A in a sequence of movement vectors 168. This may correspond, for example, to a climax in an action scene (e.g., a flash, an explosion, or some other short element of interest).

By observing direction as well as speed, further useful information about the importance of certain timestamp locations can be derived. In this way, the system can learn to ignore certain movements of the vector in a particular direction (for example, such as caused by camera movement in the movie), and to emphasize other movements in a different direction (for example, such as caused by a change in facial expression of a person).

While watching the speed and direction on the timebase of frames or groups of frames, the system also takes into consideration slow drifts in the latent space. This is carried out by comparing the positions in a longer time distance while the speed remains low to detect drifts over time, which might require a break in the time interval as there might be a new significant information. For example, a particular interval may involve a video depiction of the sky with a gradual transition from day to night. To do this, the system can be configured to first identify slow moving time intervals, and then observe the drift by observing the movement over a longer timeframe.

Based on these and other movement characteristics of the vectors in the sequence, further ANNs can be trained, allowing the efficient detection of these described time intervals, significant single data, or even the prediction of the next data in an unfinished sequence, such as the next images while editing a movie. As noted above, derivatives and/or integrals of velocity and/or direction can be evaluated to further gain information or inputs into the ANNs on top of the embedding network.

It will be noted that the interval 168A in FIG. 5B has only a single vector (frame). In practice, each interval may have any number of related vectors (frames). In some alternative embodiments, multiple sets of intervals can be generated to provide different groupings based on different criteria to enhance the searching process for different input criteria. In this alternative approach, a pair of adjacent embedding vectors may appear in the same interval using a first characterization scheme, and the respective vectors may appear in two different adjacent intervals using a different second characterization scheme. The interval groupings under both schemes can be stored and subsequently searched to provide greater depth of coverage while focusing on different changes in content characteristics.

Once each interval is identified, the search engine 122 next operates to identify the RV that best represents, in toto, the informational content of all of the embedding vectors within the associated interval. The RV can be an average or median of the vectors over a selected time interval. Alternatively, the RV can be the actual embedding vector that is closest to the average, median or other position. Similarity can be measured based on direction as well as magnitude.

FIG. 6A is a simplified representation of a latent space 170 in which a group 172 of embedding vectors 174 has been arranged based on similarity measures and boundary detection evaluations such as described above in FIGS. 5A and 5B. It will be appreciated that the latent space 170 has only two dimensions (2D) for simplicity of illustration; in practice, many more dimensions will be in play. Moreover, while it is contemplated that each of the vectors 174 would emerge from the same point of origin (e.g., the ends opposite the arrowheads would all begin from the same point), the vectors have been spread out so as to be adjacent one another in somewhat parallel fashion.

As can be seen from FIG. 6A, all of the embedding vectors 174 in the group 172 are somewhat similar, both in size and direction. In one approach, the search engine 122 operates to statistically calculate a median (mean) vector 174A as the RV for the group 172. The vector 174A is a fictitious vector, not actually appearing within the remaining vectors 174 in the group 172. Nonetheless, the vector 174 presents an averaging of all of the content represented by the remaining vectors 174, and as such, can be used as the RV for the associated interval.

FIG. 6B shows another simplified latent space 180 with a group 182 of embedding vectors 184. The group 182 in FIG. 6B is similar to the group 172 in FIG. 6A, although most of the member vectors 184 have been omitted from FIG. 6B, and the remaining vectors are shown in dotted line fashion.

In this alternative approach, the search engine 122 calculates the median of all of the vectors 184, as before. This median is represented by heavy dotted line 184A, which corresponds to the RV 174A in FIG. 6A. The search engine 122 next identifies the closest actual embedding vector within the group 182 to the median line 184A. In this case, the closest actual embedding vector is the vector identified at 184B. As such, the search engine 122 uses embedding vector 184B as the RV for the interval associated with group 182.

As desired, the search engine 122 can further characterize the differences between the embedding vector 184B and the median line 184A such as by angle θ. Other metrics can be used as well. In still further embodiments, metrics associated with the statistical variation within the interval can be determined and stored. Such metrics can represent the overall variation among the respective embedding vectors in each interval (e.g., the variation among the different ones of the vectors 174, 184, etc.).

Figures 7, 8, 9:
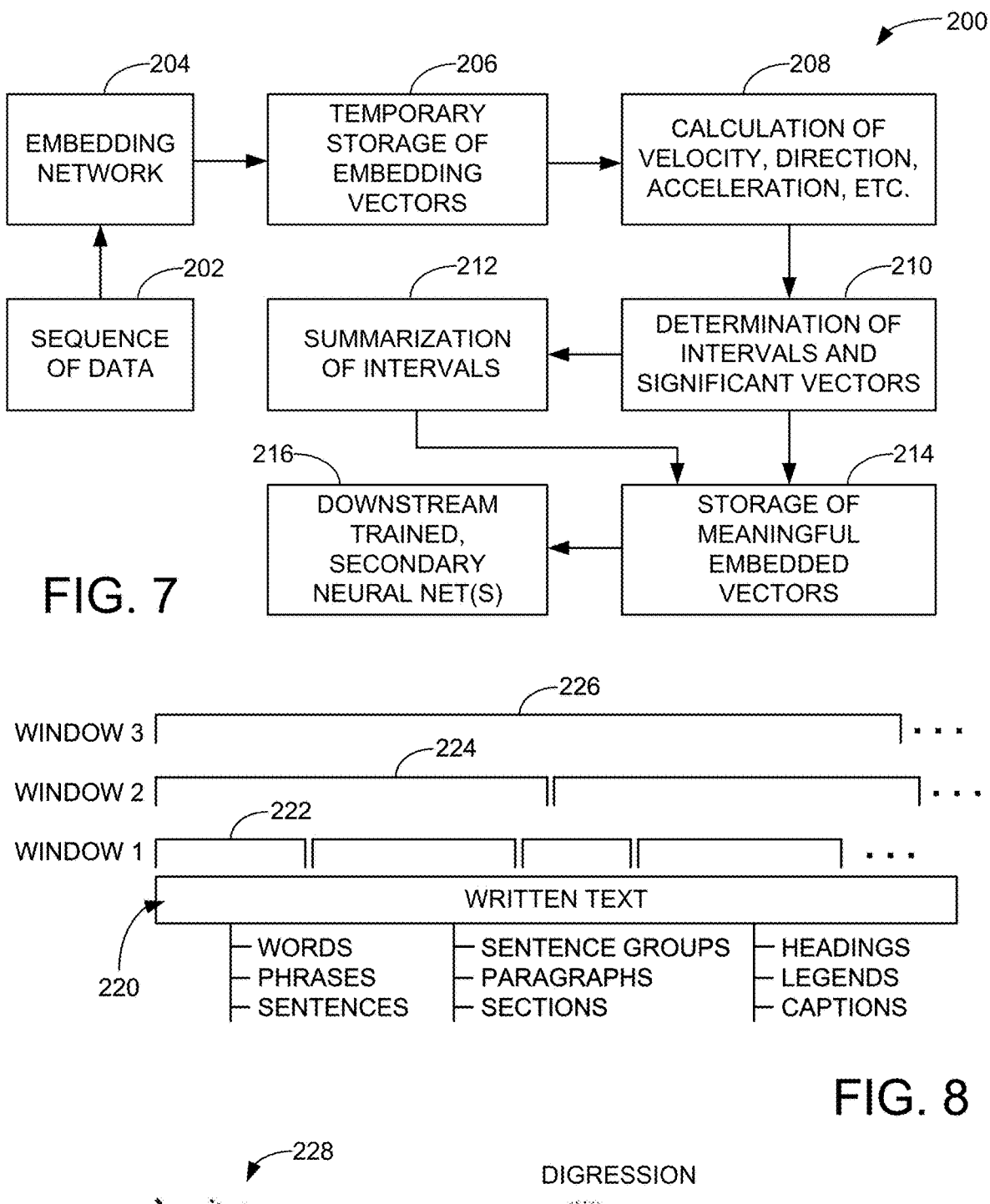
FIG. 7 is a process flow to illustrate operations carried out by the engine in accordance with further embodiments.
FIG. 8 shows a second method for identifying intervals in media content in accordance with further embodiments.
FIG. 9 depicts a manner in which a digression in the media content of FIG. 8 can be identified in further embodiments.

FIG. 7 provides a flow diagram 200 to generally outline the foregoing processing by the ANN search engine 122. An initial sequence of data (block 202) is presented to an embedding network 204 (e.g., neural net portion 138 in FIG. 2) for the generation of corresponding embedding vectors 206. Movement information is calculated or otherwise characterized from the vectors such as velocity, direction, acceleration, etc., as shown at 208. These data points may be represented by movement vectors as described above.

From this movement information, various intervals (segments) and significant vectors can be determined, as shown at 210. The intervals are identified and stored at 212, such as on a frame/timestamp basis or some other metric to enable identification of the associated intervals from the original sequence (block 202). These data are thereafter provided to a storage set of the meaningful embedding vectors at block 214. As desired, the meaningful embedding vectors can further be used to train one or more secondary neural nets 216 for subsequent processing operations.

The present discussion will now turn to the manner in which the system can characterize other forms of content, such as text. While the same overall processing technique described above is substantially the same for all forms of evaluated content, there are some differences that can be exploited to enhance the effectiveness of the characterization and search operations.

When dealing with text, it will be noted that the content is already arranged in a sequential order, albeit without a continuous time basis as with video images (e.g., at 30 fps, etc.). Rather, text content is highly variable as arranged in sentences, paragraphs, etc. These elements can be quite short, or extremely long. One main difference here is that the latent vector in such cases already embeds a subsequence in the input data sequence.

As the length of these subsequences can be arbitrary (depending on the scope, like sentences, paragraphs, and so on), the system generates multiple vectors in the latent space for the same point in time of the original sequence, for each of a number of moving windows on the data.

Thus, to evaluate a text file, the search engine operates using sliding search windows of different lengths on the sequence of data to evaluate the content. This can include evaluation of a part of a sentence, the entire sentence, a group of successive sentences, an entire paragraph, and so on. Each of these portions are introduced into the neural network, which calculates an embedding vector for each portion.

Next, the engine analyzes the movements of these embedding vectors in the same way the movement of the vectors was described above in FIGS. 4A through 4C and in FIGS. 5A and 5B. The movement relates to changes in content, so that natural breaks or transitions will again appear in relation to movements between successive portions.

This operation is generally represented in FIG. 8. A group of written text (a text file) is generally represented at 220. This file can have any number and manner of textual arrangements, including but not limited to words, phrases, sentences, groups of sentences, paragraphs, sections, headings, legends, captions, and so on.

To generate embedding vectors, a number of variable sized windows are successively applied to the text. These windows are represented as Windows 1-3 and are designated at 222, 224 and 226. In one non-limiting embodiment, Window 1 may examine each of a selected number of words; Window 2 may examine each sentence; Window 3 may examine each paragraph, and so on. Embedding vectors are generated for each grouping of the words in each window and evaluated.

Further information can be obtained by observing the behavior of the vectors, since the system has generated multiple overlapping vectors for different combinations (lengths) of the same input data sequence. Digressions can thus be easily identified as the system observes that a larger window does not produce significant movement, whereas smaller windows within the same set of text provides larger amounts of movement back and forth.

This is illustrated in FIG. 9, which provides a number of embedding vectors 228 that correspond to the embedding of different sections of the input text at different granularities. For the most part, the vectors 228 are clustered, indicating commonality of content being discussed in this section of text. However, a particular vector 228A provides a significant digression, indicating that for this short amount of text, the topic has moved to a significantly different contextual basis (such as if an aside is being made by the author at this point). Separate intervals can thus be identified and characterized to account for the larger context (group of vectors 228) and the digression (vector 228A).

Figures 10, 11, 12, 13:
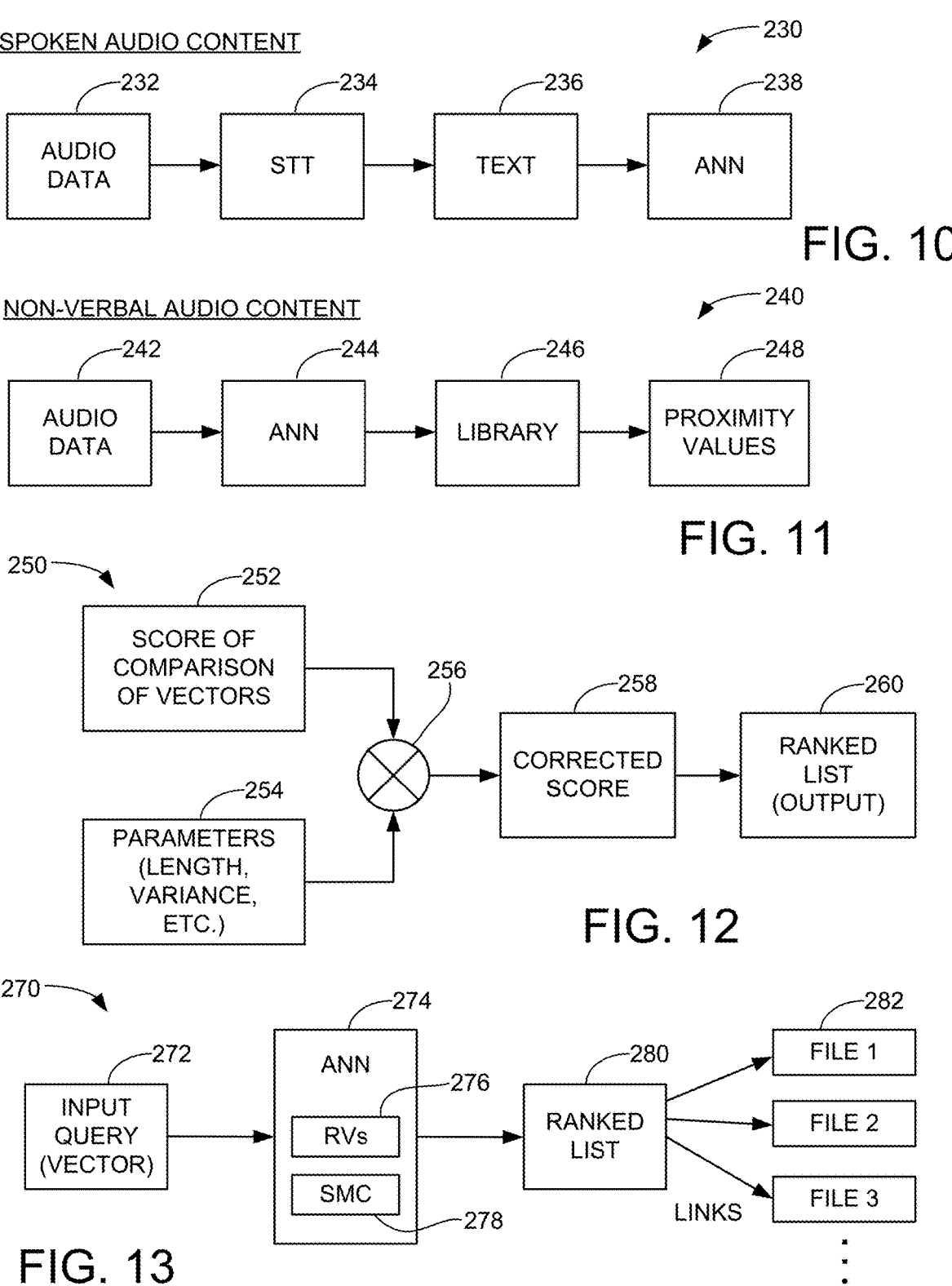
FIG. 10 shows a process flow for evaluating spoken audio content in some embodiments.
FIG. 11 shows a process flow for evaluating non-verbal audio content in some embodiments.
FIG. 12 illustrates a score processing flow carried out in accordance with further embodiments to rank the results of a particular search.
FIG. 13 is a functional block representation of another system configured to characterize and carry out searches for media content in accordance with further embodiments of the present disclosure.

Audio data can be similarly characterized. For spoken audio data such as dialog in a motion picture, a podcast, etc., a speech-to-text (STT) service can be employed to convert the audio to text, after which the text is processed as discussed above in FIGS. 8-9. This is represented in FIG. 10 for a spoken audio subsystem 230, with an input audio data set (e.g., file) 232, an STT module 234 which converts the speech to a text data set 236, and then an ANN engine 238 (similar to the engine 122 discussed above) which characterizes the text into intervals (segments) with a RV and other characterization data as before. Because the spoken audio may have a time reference, reference ID information can be stored to enable the system to locate the appropriate starting point for the desired section of audio.

In this way, a group of extended podcasts (or other content) can be quickly and easily characterized and subsequently searched. To provide another example, a search may be carried out to locate when a particular unknown speaker said a particular phrase (or a similar phrase); the system can quickly and easily locate the requested data file (or object) and queue that portion of the selected podcast for playback out of hundreds, thousands or more data files/objects.

Non-verbal (non-spoken) audio content can similarly be characterized as desired. This can include background music, sound effects, animal noises, vehicle and traffic sounds, gunshots, explosions, and/or any other type of audio information that does not necessarily have a component that can be converted to text such as via an STT module (234, FIG. 10).

This can be carried out by a non-verbal audio content system 240 that operates by presentation of an audio data set 242 to an ANN 244 (similar to those described above) to generate embedding vectors that are grouped into intervals with similar characteristics. The sounds can be evaluated by magnitude (amplitude), frequency, duration, and other characteristics. As desired, auxiliary resources such as a reference library module 246 can be used to further characterize the sounds/segments and supply appropriate tags or other supplemental ID values. Further, a proximity module 248 can be used to assign proximity values to other segments, such as tagging a background melody to a particular setting or conversation that is separately characterized elsewhere.

It will be noted that the characterization of the system can be performed on a per file basis independently of the respective types of content contained therein. Returning to the motion picture example of FIGS. 4A-4C, each of the various operations for video content, written text (including credits, written narration, etc.), spoken text, sound effects, theme music, etc. can be concurrently incorporated into the embedding vectors for that file. In some cases, the system maintains all of the embedding vectors of a particular type together (e.g., video) across all of the data sets. In other cases, the system can organize all of the different types of embedding vectors together for each file. Other organizational arrangements can be used as desired.

Further features of at least some embodiments operate to enhance the comparison and ranking functions of the system by evaluating the closeness, in the latent space, between a given search query and the population of RVs (RVs) for the various types of content. It will be appreciated that the inquiry can be converted to a vector, and then similarity measurements can take place using statistical methods to evaluate the relative closeness of each RV.

A principle behind this feature is that, for example, it generally can be assumed that if people talk for several minutes about a topic without digressions, this interval in the conversation might contain more and more useful information about that topic, compared to the situation when the participants talk about this topic just in a short digression while discussing something completely different.

When getting useful intervals as described above (see e.g., the first method set forth in FIG. 4A et seq, and the second method set forth in FIG. 8 et seq.), the individual vectors in each interval are combined into an RV, such as by creating an average or median of the vectors or other methods. As mentioned above, the RV can then be used to generate a ranking when comparing vectors to another vector (for example a search or query vector). For example, similarity measure can be evaluated by comparing the dot product between a query vector and the RVs from the identified intervals. This can provide a score value for each RV which can be used to rank the intervals regarding their similarity to the input query.

To further refine this ranking, the score can be modified by combining the length of the interval and/or the variance of the embedding vectors in the interval and/or other statistical parameters with the result (for example dot product) from the initial comparison of the vectors (for example by multiplying, dividing, etc.).

This operation is represented in FIG. 12, which provides a ranking operation of the system 100 (via the ANN 122) in accordance with further embodiments. A score value for each of the intervals is represented at block 252. This is compared or otherwise combined with one or more parameters at block 254 via combinatorial function 256 to provide a corrected (modified) score value 258. The intervals in the various data sets can thereafter be sorted in a ranked list or other output 260 supplied to the user.

An overview of the system operation is provided at 270 in FIG. 13. The system 270 is similar to the systems 100, 120 described above. An input query 272 is supplied via the user, such as via a text prompt, although other mechanisms can be used as required. The content of the query is converted to a query vector in the associated latent space by an ANN search engine 274. The engine 274 has various features described previously, as well as a dataset of RVs 276 for the various intervals characterized from the associated content, and a similarity measurement circuit (SMC) 278 which performs the various evaluations and comparison operations described above.

The results of the comparisons between the input vector and the stored RVs are provided in the form of a ranked list 280. In some cases, a lower threshold is supplied so that segments having a similarity measure less than some lower threshold are not included in the results. In another arrangement, the top X most significant intervals are listed, where X is a plural number. Other arrangements can be used.

In some cases, the results will be across all media types, and will list the associated file, location data, an excerpt, etc. as required. In some cases, the interface is arranged such that, upon clicking a particular selection, a link is activated to play the associated file 282 on the user's client device at the queued location. In some cases, for a given set of dialogue that is desired, the system may queue the system back to a suitable previous point (e.g., the beginning of the scene having the desired content, some number Y of seconds or frames prior to the desired section, etc.).

The user can thereafter utilize the identified content in any suitable and legal manner, including creating a new work with or without further use of an ANN system. In some cases, the ANN search engine 274 can be configured to take selected outputs from the results of one or more searches and generate new content or perform other suitable tasks as required.

While the foregoing discussion has presented an efficient and effective system for evaluating large volumes of media content and other forms of data, it will be appreciated that the arrangement of the embedding vectors and the RVs in a given latent space will require an understanding and consistency of that space over time. Stated another way, the embedding vectors generated herein will have a format that is tied to the particular embedding model used to generate the embedding vectors.

Switching to a new model, such as in the case of advancements in the art, economic reasons, etc., will tend to largely render the existing embedding vectors unusable. For example, should a large database of embedding vectors have been generated using an old model, it would generally be necessary to discard the old database and regenerate the embedding vectors using the new model. This can be time and resource intensive, particularly in situations where large databases of embedding vectors have been accumulated from large amounts of input data, such as contemplated above for large repositories of media data.

Accordingly, further embodiments of the present disclosure have additional capabilities to enable the translation of embedding vectors among different models, thereby eliminating the need to continually recharacterize and update previously segmented content in the face of newer, more capable systems.

More specifically, the various systems provided herein, including the systems 100, 120 and 270, are provided in at least some cases with the capability of transforming an existing set of embedding vectors into a new format suitable for a new model without the need to recreate the embedding vectors from the original input data.

As explained below, a correction model is developed and used to transform the vectors of the embedding of one model to another model. The correction model, also sometimes referred to as a transformation model, learns the mathematical rules to transform the vector representations from the latent space of each model. The model can accommodate transforms into different dimensional spaces, including from a lower space to a higher space and vice versa.

The various systems and methods embodied herein provide a training phase and an application phase. Each can employ a variety of approaches. These can be carried out as separate operations by the various ANN search engines (or other system elements), in conjunction with a search or at other times.

Figures 14, 15, 16:
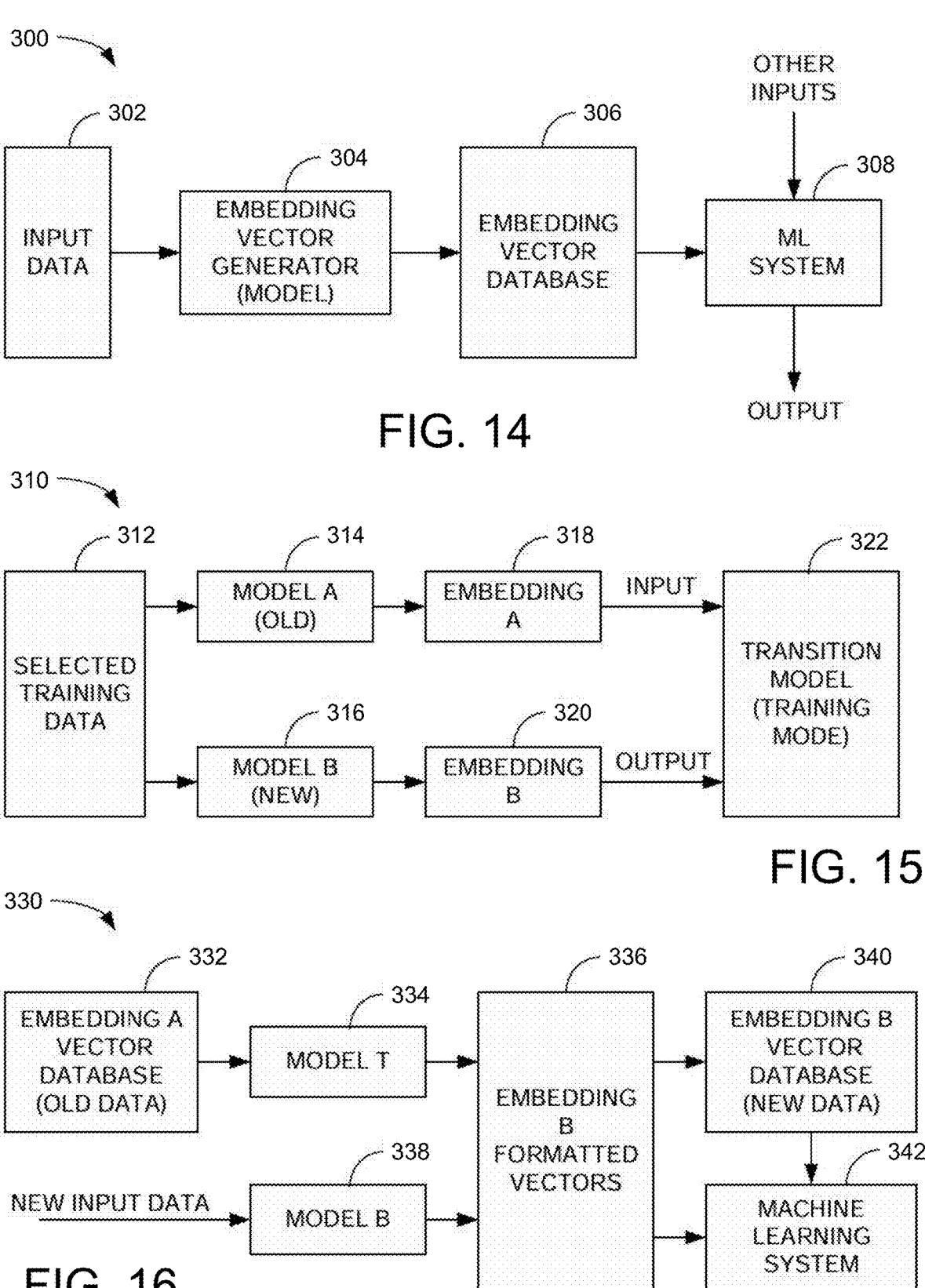
FIG. 14 is a functional block diagram of an embedding vector generation system to illustrate further aspects of at least some embodiments of the present disclosure.
FIG. 15 shows translation aspects of the system of FIG. 14 in further embodiments.
FIG. 16 shows further embodiments that utilize a trained model such as from FIG. 15.

FIG. 14 shows another data processing system 300 in accordance with some embodiments. While these details are not separately depicted in detail, it will be understood the system is computer based and may utilize one or more programmable or hardware processors and suitable programming instructions in the form of firmware, software, apps, etc. to execute the various functions described herein.

While not limiting, in some cases the system 300 represents a large scale, geographically distributed data processing system that involves servers that communicate over a network, including the Internet, to store, transfer and process large data sets. Cloud computing, container, edge computing and other processing techniques and data storage and management systems, including mass data storage arrays involving data storage devices, can be utilized as required. Local client devices can be provided to enable user access and operation.

Input data are generally represented at 302 and are stored in one or more data storage devices with associated non-volatile memory. The data can take any number of types, including but not limited to a local or remote repository of digital content, such as a server or drive that stores user data sets (e.g., files, objects, etc.). While not limiting, the data sets may constitute media elements of various types including, but not limited to, videos, movies, sound recordings, podcasts, text articles, documents, images, etc. as described above. Other forms of data can be processed as well.

An embedding vector generator 304, also referred to as a model, transforms the various input data elements into a corresponding set of embedding vectors. As described previously, each embedding vector is a string of numbers in an n-dimensional space that represents various features, characteristics, measures, etc. of the associated input data element. Control data can be incorporated into the embedding vector. The transformation can take any number of forms, but generally results in the generation of one or more multi-dimensional vectors in a latent space defined by the model. The particular form of a given embedding vector will of course depend on the model, and any number of different types of embedding vector formats can be used as required. Different forms and types of embedding vectors may also be provided for different types of input data.

In the case of a movie, each frame of the video may be identified and processed using a neural network function of the model to generate a corresponding multi-dimensional vector. Compression, similarity measures and groupings of vectors can be made as desired, depending on the model and system requirements.

Text and similar types of data that do not have a repetitive, equally time-spaced sequence like a frame rate may result in the dividing of the content into appropriate groupings, such as sentences, which can vary greatly in length and are often arbitrary. Context processors can evaluate the content of these groupings to assign values within the vector space for each unit. A moving or sliding window of different length on the sequences (part of sentence, full sentence, group of sentences, etc.) may be used to obtain combined vectors.

Audio recordings, such as but not limited to dialog or monologue data in a podcast or other types of data may use speech-to-text conversion, context evaluation and other techniques to identify segments of associated content. The segments can be identified and combined vectors generated as before for each segment. Images can be processed using spectral content, object detection, velocity and other parameters to map the images to the vector space. Other forms of input data elements can be similarly encoded.

It will be appreciated that the actual mapping and vector space is unimportant, only that the input data 302, of whatever type or types, are mapped as multi-dimensional vectors of numerical values by the model 304. The resulting embedding vectors can be stored in a suitable memory as a database 306, which can then be used, as desired, as an input to a machine learning (ML) system 308 for various purposes. While not limiting the ML system 308 can be a search engine, a rendering system, a neural network model that uses the input data along with other inputs to generate a desired output, and so on. The ML system 308 may be the same or different in both construction and operation as the aforedescribed ANN search engines. In some cases, the ML system 308 is incorporated into such engine.

While not limiting, it is contemplated that the use of the model 304 to generate the vectors in the database 306 advantageously enables the processing capabilities and efficiencies of the ML system 308. That is, rather than providing the input data 302 directly to the ML system 308, the transformation of the input data into the vector space (e.g., long sequences of numbers) greatly enhances the processing capabilities of the ML system. It is further contemplated albeit not required that the input data, and the resulting embedding vector database, are both extensive (e.g., constitute large respective data sets occupying large amounts of data storage, required extensive time or resources to generate and accumulate, and so on).

FIG. 15 shows a training system 310 that generates a compensation model, also referred to as a correction model or a transformation model, that can be used when a new embedding model is desired for use with the system 300 in FIG. 14. As noted above, there are times in the ML space where newer and better models are introduced with enhanced features. This can include higher resolution/dimensional models, models that work more efficiently and/or at lower cost, models that provide additional features or data capabilities not available with older models, and so on.

In the present example, a newer model is being introduced into the system. FIG. 15 thus enables the data accumulated by the previous operation of the systems of FIGS. 1 and 13 to be retained and transformed for use with the newer model.

FIG. 15 thus shows the training system 310 to include a selected set of training data 312 (discussed more fully below). The existing model is denoted at 314 as Model A, and may correspond to the embedding vector generator 304 in FIG. 14. The new model is denoted at 316 and is identified as Model B.

The specially selected set of training data 312 may be a subset of the data from FIG. 14, or may be entirely new, different training data representative of the types of data used in FIG. 14. The data should be selected to enable the system to fairly and accurately understand the response by both the old and new models 314, 316. As such, the training data are used as inputs to both models A and B to generate respective sets of embedding vector data, referred to as Embedding A 318 and Embedding B 320, respectively.

In some cases, there are significant differences between the dimensionality and other features of the respective models; without limitation, in some embodiments Model A is contemplated as providing a vector space of 512 dimensions and Model B is contemplated as providing a vector space of 1024 dimensions. Other differences in the models are contemplated as well. Any levels of dimensionality can be used.

A transition model 322 is trained using the respective Embeddings A and B 318, 320. This can be carried out in a variety of ways. In FIG. 15, the Embedding A data are used as inputs and the Embedding B data are used as the outputs, so that the transition model 322 determines the necessary transformation to convert Model A data to Model B data. Additional training mechanisms can be employed during this processing that incorporate additional information including architecture, weights, context and other data as required.

FIG. 16 shows another processing system 330 that thereafter operates during the application of the trained transition model (hereinafter also referred to as Model T).

The system 330 includes a database of the old embedding vectors, referred to in FIG. 16 as Embedding A vectors in a database 332. This can include or otherwise correspond to the old data in FIGS. 14 and 15 discussed above.

To transform this data to the new format (Model B from FIG. 15), the Embedding A vectors from database 332 are supplied to the trained Model T block shown at 334, providing output vectors as Embedding B format vectors 336. Newly presented data can be supplied to the new Model B block 338 to similarly generate output vectors in the same Embedding B format as provided in block 320 in FIG. 15. These vectors can thereafter be used as required, including storage in an Embedding B database 340 and use in an ML system 342.

The Embedding B vectors from Model T block 334 can be viewed as transformed vectors based on first input data (e.g., the original data used to generate the Embedding A vectors), and the Embedding B vectors from Model B block 338 can be viewed as native vectors based on second input data input to the Model B block.

Various alternative applications can be utilized for the data. The older version data can continue to be stored and transformed as needed, or all of the data can be transformed. In some cases, maintaining the older version data (e.g., block 332) can be advantageous since enhancements in the Model T can continue to be made, so that future transformations of the older data can be made with enhanced accuracy.

From this it can be seen that the system can accommodate various sets of embedding vectors and RVs in different latent spaces. In some cases, the embedding vectors and RVs may be generated for a first latent space as defined by a first embedding model. Some or all of the embedding vectors and/or the RVs may be subsequently transformed into a second latent space as defined by a different, second embedding model.

Thereafter, search queries and other system operations may be processed using vectors (either the RVs and/or the underlying subsets of embedding vectors in each group) in different latent spaces, with transformations taking place as required to place all of the vectors in a common format (thereby allowing a so-called "apples to apples comparison" among the data).

It will now be appreciated that the ANN search engine as variously discussed herein can be utilized to process any number of different types of data in any number of different formats and storage locations. A single set of embedding vectors (and associated RVs) can be developed, and these can be transformed as needed including on-the-fly to accommodate newly added content to the library, so that it remains unnecessary to repeat a full embedding characterization of the works.

Based on the significant data sizes (in some cases, data bases of multiple thousands of titles, songs, documents, clips and more), it is advantageous to be able to leave the base content in its existing legacy form and storage location, allowing access to such as required, and relying upon the model transformation capabilities to accommodate newer encoding systems.

Reverse transforms can easily be generated as well, enabling data originally processed using the new system (e.g., Model B) can be transitioned to the Model A embedding format by reversing the processing in FIG. 15, thereby generating a second, inverse transformation model such as Model TI.

If multiple models/ML processing types are required, generating and maintaining suitable transformation models (e.g., various Model T blocks) allow the embedding vectors to be stored and maintained in a form that is best suited to storage and management, and then transformed on-the-fly as required for any processing, including newly developed processing techniques. In some cases, the transformational information from the models can further be used to enhance generation, storage and use of the various embedding vector types.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A computer-implemented method for transforming and accessing a repository of digital content in the form of computer data sets, the method comprising:

under the control of one or more processors executing on a computer system:

retrieving each of a plurality of computer data sets from a memory associated with the computer system, each computer data set comprising a video file or object comprising a succession of video frames, each video frame having a visual content and an associated timestamp;

for each retrieved computer data set:

generating a sequence of embedding vectors in a multi-dimensional latent space of the memory to describe the visual content of each video frame of the computer data set;

generating a corresponding sequence of movement vectors to describe a difference between each successive pair of the video frames in the computer data set;

partitioning the sequence of embedding vectors into a succession of segments, each segment comprising a subset of the embedding vectors having similar movement vectors and corresponding to a different interval within the computer data set;

for each segment:

determining a representative vector (RV) to describe the visual content of the video frames associated with the subset of the embedding vectors for the segment; and storing the RV and an associated scoring value for the segment in the computer memory;

submitting a query input via an agent interface of the computer system, the query input supplied by an agent and having an informational content in a textual form;

generating a query vector responsive to the query input and indicative of the informational content;

comparing each RV to the query vector to form a ranked list of the segments in an order based on a similarity measure; and displaying, on a display device of the computer system, the visual content of a selected frame of a selected computer data set in relation to the ranked list, the visual content of the selected frame corresponding to the informational content of the query input.

2. The method of claim 1, wherein the sequence of embedding vectors is generated using an artificial neural network (ANN) search engine circuit of the computer system which evaluates each of the video frames of the computer data set in turn to generate an associated embedding vector therefor, and wherein the method further comprises:

using the ANN search engine circuit to aggregate the RV
and associated scoring value for each segment into a set
of RVs;

forwarding the set of RVs as an input to a downstream,
secondary ANN circuit; and identifying the selected frame using an output of the
secondary ANN circuit.

3. The method of claim 1, wherein the RV for each
segment is statistically determined as an average of all of the
subset of the embedding vectors in the segment.

4. The method of claim 1, wherein the RV for each
segment comprises a closest one of the subset of the video
frames in the segment to a statistical center location of the
subset of the embedding vectors in the segment.

5. The method of claim 4, wherein distance information is
additionally determined and saved for the RV for each
segment to describe a difference between the RV and the
statistical center location.

6. The method of claim 1, wherein the selected frame has
a selected timestamp, and wherein the selected frame is
displayed using a video player queued to the selected
timestamp.

7. The method of claim 1, wherein the plurality of
computer data sets are a first plurality of computer data sets,
and wherein the method further comprises;

retrieving each of a second plurality of computer data sets
from the memory, each of the second plurality of
computer data sets comprising a text file or object
comprising a succession of words arranged into sen-
tences and having a textual content;

for each retrieved computer data set in the second plu-
rality of computer data sets:

generating a second sequence of embedding vectors in
a multi-dimensional latent space of the memory to
describe the textual content of each of a plurality of
overlapping groupings of the words; and partitioning the second sequence of embedding vectors
into a succession of textual segments, each segment
comprising a cluster of the embedding vectors hav-
ing similar textual content;

for each textual segment:

determining a textual representative vector to
describe the textual content of the textual segment;
and storing the textual representative vector in the com-
puter memory;

wherein, responsive to the submitted query input via the
agent interface, the one or more processors further
operate to;

generate a textual query vector responsive to the infor-
mational content of the query input;

compare each textual representative vector to the tex-
tual query vector to form a ranked list; and display, on the display device of the computer system,
the textual content of at least one textual segment
having a textual content corresponding to informa-
tional content of the query input.

8. The method of claim 7, wherein the text file or object
of a selected computer data set of the second plurality of
computer data sets comprises a transcript of an audio file or
object comprising a sequence of spoken words, and wherein
the method further comprises converting the sequence of
spoken words into text using a speech-to-text (STT) module
and queuing an audio player of the computer system at a
location in the audio file or object corresponding to the
informational content of the query input.

9. The method of claim 1, wherein each movement vector
corresponds to a change in position of end points of each
successive pairs of the embedding vectors.

10. The method of claim 1, wherein the ranked list is
displayed on the display device of the computer device.

11. The method of claim 1, further comprising:

under the control of one or more of the processors
executing on the computer system:

generating the sequence of embedding vectors for each
computer data set as a first set of embedding vectors
in a first latent space defined by a first embedding
model;

transforming the first set of embedding vectors into a
second set of embedding vectors in a different,
second latent space defined by a different, second
embedding model; and processing the search query input using both the second
set of embedding vectors as well as an additional set
of embedding vectors in the first latent space.

12. The method of claim 1, further comprising:

under the control of one or more processors executing on
a computer system:

aggregating the RV for each segment into a first set of
RVs in a first latent space defined by a first embed-
ding model;

transforming at least selected ones of the first set of
RVs into a second set of RVs in a different, second
latent space defined by a different, second embed-
ding model; and processing the search query input using both the first
and second sets of RVs.

13. The method of claim 1, wherein each of the subset of
the embedding vectors in each segment have a similarity
measure less than a threshold, and wherein the ranked list is
further generated responsive to the scoring value associated
with each segment.

14. A computer system for transforming and accessing a
repository of digital content, the computer system compris-
ing:

a computer memory configured to store the repository of
digital content in the form of a plurality of computer
data sets, each computer data set comprising a video
file or object comprising a succession of video frames,
each video frame having a visual content and an
associated timestamp;

a display device coupled to the computer memory con-
figured to facilitate a playback display of the plurality
of computer data sets;

an artificial neural network (ANN) circuit comprising one
or more processors executing instructions in the com-
puter memory to:

retrieve each of the plurality of computer data sets from
the memory in turn;

for each retrieved computer data set:

generate a sequence of embedding vectors in a
multi-dimensional latent space of the computer
memory to describe the visual content of each of
the video frames of the computer data set, generate a corresponding sequence of movement
vectors to describe a difference between each
successive pair of the sequence of embedding
vectors, and use movement characteristics of the selected move-
ment vectors to partition the sequence of embed-
ding vectors into a succession of segments, each
segment comprising a subset of the embedding vectors having similar movement vectors and corresponding to a different interval within the computer data; and determine a representative vector (RV) for each segment and store the RV in the computer memory, the RV describing the content of the subset of the embedding vectors for the segment;

receive a query input from an agent interface, the query input in textual form and having an informational content corresponding to a desired visual content specified by an agent;

generate a query vector responsive to the query input and indicative of the informational content;

compare each RV to the query vector to form a ranked list of the segments in an order based on a similarity measure; and display, on the display device, at least one video frame from a selected segment of a selected computer data set in relation to the ranked list, the selected segment including the desired visual content specified by the agent via the query input.

15. The computer system of claim 14, wherein the one or more processors further execute instructions in the computer memory to generate:

a first embedding model in the computer memory that utilizes a computational neural network circuit to generate first embedding vectors as multi-dimensional vectors in a first latent space defined by the first embedding model representative of characteristics of first input data and stored in a first database in a computer memory coupled to the first embedding model;

a transformation model in the computer memory that utilizes a second computational neural network circuit to transform the first embedding vectors into second embedding vectors in a second latent space defined by a different, second embedding model; and a machine language system that receives, as inputs, the transformed second embedding vectors from the transformation model as well as native second embedding vectors from the second embedding model operative upon second input data to generate an output response that transforms the transformed and native second embedding vectors to an output vector.

16. The apparatus of claim 14, wherein the RV for each segment is statistically determined by the ANN circuit as a separate embedding vector not included within the subset of the embedding vectors in the segment and represents an average of all of the subset of the embedding vectors in the segment.

17. The apparatus of claim 14, wherein the ANN circuit is further configured to calculate a statistical center location for each segment, and to select the RV for each segment as a closest one of the subset of the embedding vectors in the segment to the statistical center location for the segment.

18. The apparatus of claim 14, wherein the selected computer data set comprises a number of successive scenes, wherein the selected segment is disposed within a selected scene, and wherein the display shows a video player queued to commence playback of the selected computer data set at the beginning of the selected scene.

19. The apparatus of claim 14, wherein the plurality of computer data sets are a first plurality of computer data sets, and wherein the method further comprises:

retrieving each of a second plurality of computer data sets from the memory, each of the second plurality of computer data sets comprising a text file or object comprising a succession of words arranged into sentences and having a textual content;

for each retrieved computer data set in the second plurality of computer data sets:

generating a second sequence of embedding vectors in a multi-dimensional latent space of the memory to describe the textual content of each of a plurality of overlapping groupings of the words; and partitioning the second sequence of embedding vectors into a succession of textual segments, each segment comprising a cluster of the embedding vectors having similar textual content;

for each textual segment:

determining a textual representative vector to describe the textual content of the textual segment; and storing the textual representative vector in the computer memory;

wherein, responsive to the submitted query input via the agent interface, the one or more processors further operate to:

generate a textual query vector responsive to the informational content of the query input;

compare each textual representative vector to the textual query vector to form a ranked list; and display, on the display device of the computer system, the textual content of at least one textual segment having a textual content corresponding to informational content of the query input.

20. The apparatus of claim 14, wherein each movement vector in the sequence of movement vectors corresponds to a change in position of end points of each successive pairs of the embedding vectors.

21. A computer-implemented method for transforming and accessing a repository of digital content in the form of computer data sets, the method comprising:

selecting a computerized data set stored in a computer memory, the computerized data set arranged as a video file or object having a succession of video frames, each video frame having an associated visual content and timestamp;

using an artificial neural network (ANN) search engine circuit realized in at least one programmable processor to carry out steps of:

partitioning the computerized data set into segments, each segment comprising a different subset of the sequential elements, by:

generating an embedding vector in a multi-dimensional latent space for each video frame in the computerized data set;

generating a corresponding movement vector to describe a difference in velocity between each successive pair of the embedding vectors associated with each successive pair of the video frames; and using the movement vectors to define the segments;

constructing a representative vector (RV) for the embedding vectors associated with the video frames in each segment using a statistical analysis of the embedding vectors in each segment; and aggregating the RV for each segment into a set of RVs;

storing the set of RVs in the computer memory; and forwarding the set of RVs as an input to a downstream, secondary ANN circuit;

generating a search vector responsive to a query input submitted by an agent via an agent interface, the query input identifying a desired visual content;

comparing the search vector to each RV in the set of RVs to evaluate a similarity of the segments from the computerized data set to the desired visual content of the query input;

forming a ranked list of the segments in an order based on the comparing step; and queuing for playback, on a display device, the computer data set at a location corresponding to a selected segment of the computer data set responsive to the ranked list and responsive to an output of the secondary ANN circuit, the selected segment corresponding to the desired visual content of the query input; and commencing playback of the computer data set on the display device beginning at the location responsive to an input from the agent.

22. The method of claim 21, wherein the plurality of computer data sets are a first plurality of computer data sets, and wherein the method further comprises:

retrieving each of a second plurality of computer data sets from the memory, each of the second plurality of computer data sets comprising a text file or object comprising a succession of words arranged into sentences and having a textual content;

for each retrieved computer data set in the second plurality of computer data sets:

generating a second sequence of embedding vectors in a multi-dimensional latent space of the memory to describe the textual content of each of a plurality of overlapping groupings of the words; and partitioning the second sequence of embedding vectors into a succession of textual segments, each segment comprising a cluster of the embedding vectors having similar textual content:

for each textual segment:

determining a textual representative vector to describe the textual content of the textual segment; and storing the textual representative vector in the computer memory;

wherein, responsive to the submitted query input via the agent interface, the one or more processors further operate to;

generate a textual query vector responsive to the informational content of the query input;

compare each textual representative vector to the textual query vector to form a ranked list; and display, on the display device of the computer system, the textual content of at least one textual segment having a textual content corresponding to informational content of the query input.

23. The method of claim 21, wherein the RV for a selected segment corresponds to an average of the embedding vectors associated with the selected segment.

24. The method of claim 21, wherein the location of the computerized data set corresponds to a timestamp of a selected frame of the selected segment.

25. The method of claim 21, wherein each of the embedding vectors of the selected segment have similar movement vectors, and wherein the RV represents a median or average of each of the embedding vectors of the selected segment.

26. The method of claim 25, wherein the RV of the selected segment is a statistical mean of the embedding vectors of the selected segment.

27. The method of claim 25, wherein the RV is a selected one of the embedding vectors of the selected segment that is closest to a statistical median of the embedding vectors of the selected segment.

28. The method of claim 1, wherein the selected computer data set comprises a number of successive scenes, wherein the selected frame is disposed within a selected scene, and wherein the displaying step further comprises queuing a video player of the display device to commence playback of the computer data set at a beginning of the selected scene.

29. The apparatus of claim 14, wherein the at least one video frame has a selected timestamp, and wherein a video player of the display is queued to the selected timestamp so that user activation of the video player results in playing of the computer data set commencing at the at least one video frame.

30. The method of claim 22, wherein the text file or object of a selected computer data set of the second plurality of computer data sets comprises a transcript of an audio file or object comprising a sequence of spoken words, and wherein the method further comprises converting the sequence of spoken words into text using a speech-to-text (STT) module and queuing an audio player of the computer system at a location in the audio file or object corresponding to the informational content of the query input.

*    *    *    *    *